United States Patent [19]

Falgén et al.

[11] Patent Number: 5,487,881
[45] Date of Patent: Jan. 30, 1996

[54] PROCESS OF PRODUCING CHLORINE DIOXIDE

[75] Inventors: Helena Falgén; Göran Sundström; Johan Landfors, all of Sundsvall, Sweden; John C. Sokol, Marietta, Ga.

[73] Assignee: EKA Nobel Inc., Marietta, Ga.

[21] Appl. No.: 120,814

[22] Filed: Sep. 15, 1993

Related U.S. Application Data

[63] Continuation-in-part of Ser. No. 23,561, Feb. 26, 1993, Pat. No. 5,380,517.

[30] Foreign Application Priority Data

Jul. 2, 1993 [SE] Sweden .................................. 9302279

[51] Int. Cl.$^6$ ..................................................... C01B 11/02
[52] U.S. Cl. ............................................ 423/478; 205/503
[58] Field of Search ................................... 423/478, 477; 252/187.21; 204/95

[56] References Cited

U.S. PATENT DOCUMENTS

| | | | |
|---|---|---|---|
| 2,332,181 | 10/1943 | Soule | 423/478 |
| 2,833,624 | 5/1958 | Sprauer | 423/478 |
| 3,341,288 | 9/1967 | Partridge et al. | 423/478 |
| 3,563,702 | 2/1971 | Partridge et al. | 423/478 |
| 3,760,065 | 9/1973 | Rapson | 423/478 |
| 3,810,969 | 5/1974 | Schlumberger | 423/478 |
| 4,129,484 | 12/1978 | Larsson | 423/478 |
| 4,325,934 | 4/1982 | Swindells et al. | 423/478 |
| 4,465,658 | 8/1984 | Fredette | 423/478 |
| 4,683,039 | 7/1987 | Twardowski et al. | 204/95 |
| 4,798,715 | 1/1989 | Hardee et al. | 423/478 |
| 4,806,215 | 2/1989 | Twardowski | 423/478 |
| 4,915,927 | 4/1990 | Lipsztajn et al. | 204/103 |
| 5,084,148 | 1/1992 | Kazcur et al. | 423/475 |
| 5,091,166 | 2/1992 | Engstrom et al. | 428/478 |
| 5,091,167 | 2/1992 | Engstrom et al. | 428/478 |
| 5,106,465 | 4/1992 | Kaczur et al. | 423/477 |
| 5,108,560 | 4/1992 | Cawlfield et al. | 204/103 |
| 5,116,595 | 5/1992 | Scribner et al. | 423/478 |
| 5,122,240 | 6/1992 | Cowley et al. | 204/101 |
| 5,174,868 | 12/1992 | Lipsztajn et al. | 204/101 |
| 5,198,080 | 3/1993 | Cowley et al. | 204/101 |

FOREIGN PATENT DOCUMENTS

| | | |
|---|---|---|
| 0473560 | 3/1992 | European Pat. Off. . |
| 0473559 | 3/1992 | European Pat. Off. . |
| 0532188 | 3/1993 | European Pat. Off. . |
| 8203 | 1/1988 | Japan .................... 428/478 |
| 3-115102 | 5/1991 | Japan .................... 423/478 |
| WO90/10733 | 9/1990 | WIPO . |
| WO91/12356 | 8/1991 | WIPO . |
| WO92/03374 | 3/1992 | WIPO . |

OTHER PUBLICATIONS

Jörissen et al, "The Behavior of Ion Exchange Membranes in Electrolysis and electrodialysis of Sodium Sulphate", Journal of Applied Electrochemistry, vol. 21 1991 pp. 869–876.

Abstract, Derwent Publications, JP-A-3 115 102 (Daiso Co Ltd) 16 May 1991.

Primary Examiner—Gary P. Straub
Assistant Examiner—N. M. Nguyen
Attorney, Agent, or Firm—Leydig, Voit & Mayer

[57] ABSTRACT

The invention relates to a process of producing chlorine dioxide using, in a first alternative atmospheric pressure and hydrogen peroxide in the reaction medium optionally with an electrolytic cell. In a second alternative, either atmospheric or subatmospheric pressure is used in the reaction medium together with an organic or inorganic reducing agent and an electrolytic cell.

18 Claims, 2 Drawing Sheets

PROCESS OF PRODUCING CHLORINE DIOXIDE

CROSS REFERENCE TO RELATED APPLICATION

This application is a continuation-in-part of application Ser. No. 08/023,561, filed Feb. 26, 1993, now U.S. Pat. No. 5,380,517.

BACKGROUND OF THE INVENTION

The present invention relates to a process of continuously producing chlorine dioxide. The process comprises reducing chlorate in an acidic reaction medium and, optionally, circulating generator solution between a chlorine dioxide generator and an electrochemical cell. When using an electrochemical cell, the process is performed without crystallization of sulfate and without formation of any solid by-products. The process can also be performed under a wide range of pressures, from vacuum to above atmospheric pressure. In one process alternative, a wide range of reducing agents can be used, including methanol and hydrogen peroxide.

Chlorine dioxide used in aqueous solution is of considerable commercial interest, mainly in pulp bleaching, but also in water purification, fat bleaching, removal of phenols from industrial wastes, etc. It is therefore desirable to provide processes in which chlorine dioxide can be efficiently produced. Considerable research is also directed to the handling of by-products such as chlorine and mineral acid salts.

There are numerous different processes for chlorine dioxide production. Most processes in commercial use involve reaction of alkali metal (e.g. sodium) chlorate in an acidic medium with a reducing agent. The acidity is generally provided by sulfuric acid.

The following reaction scheme is applicable to a number of different chlorine dioxide processes. Alkali metal chlorate and sulfuric acid are brought continuously to a reaction vessel to which air and the reducing agent are introduced, usually into the bottom of the vessel. Then chlorine dioxide and air leave from the top of the reaction vessel and a depleted reaction solution is withdrawn for further treatment. It is common to use more than one vessel whereby the depleted reaction solution from the first vessel is brought to a second (and subsequent) vessel together with air and reducing agent for further conversion of the remaining chlorate. The reaction in the reaction vessel(s) is carried out at about atmospheric pressure. Reducing agents used in this type of reaction are sulfur dioxide (the Mathieson process), methanol (the Solvay process) and chloride ions (the R-2 process). The basic chemical reaction involved in the process with chloride ions can be summarized with the formula:

$$ClO_3^- + Cl^- + 2\,H^+ \rightarrow ClO_2 + \tfrac{1}{2}Cl_2 + H_2O \qquad [1]$$

The other reducing agents are indirect reducing agents, the direct reaction between chlorate ions and methanol or sulfur dioxide being very slow. The direct reducing agent in these cases are chloride ions reacting according to [1]. The chlorine produced is then reacting with methanol to regenerate chloride ions according to the formula:

$$CH_3OH + Cl_2 + H_2O \rightarrow 6\,Cl^- + CO_2 + 6\,H^+ \qquad [2]$$

or with sulfur dioxide according to the formula:

$$SO_2 + Cl_2 + 2\,H_2O \rightarrow 2\,HCl + H_2SO_4 \qquad [3]$$

As is evident from reaction [1] a large amount of chlorine is produced as a by-product when chloride ions are used as reducing agent. To reduce the amount of chlorine by-product formed in the process, methanol has been used instead of chloride ions as the reducing agent. However, with methanol and also with sulfur dioxide, a certain amount of chlorine is produced since chloride ions are involved in the reduction process. It is also common in these processes to add a small amount of chloride ions, in the form of sodium chloride or hydrochloric acid, to increase the efficiency. Formerly, the chlorine by-product has been utilized in paper mills, but due to increased environmental demands there is a decreasing need for chlorine.

The change over from chloride ions to methanol as the reducing agent also resulted in the disadvantage of formation of by-products other than chlorine in the reaction system. The reaction according to reaction [2] above represents only the theoretical methanol oxidation. However, in practical production, inefficiencies in the methanol oxidation bring about the formation of formaldehyde and formic acid and probably also ethers and esters along with carbon dioxide. It could be expected that reactions can occur in the bleaching train with these by-products thereby resulting in chlorinated organic compounds.

Besides the drawback of formation of chlorine and other by-products, the old R–2, Solvay and Mathieson processes also have the disadvantage of low efficiency and low production rates. The efficiency for a normal Mathieson process calculated as chlorate transformed into chlorine dioxide is typically not more than about 88%.

To increase the efficiency of these processes it has been suggested to run the processes in a single vessel under subatmospheric pressure. Chlorine dioxide is then generated continuously together with the evaporated aqueous reaction medium. The alkali metal sulfate by-product is crystallized. This process is disclosed e.g. in U.S. Pat. No. 4,081,520. This process and similar "single vessel process" ("SVP" process) technologies generally increase the efficiency to acceptable levels while maintaining low levels of chlorine effluent. Patents issued after the above mentioned patent describe different embodiments attempting to optimize the process with as low chlorine production as possible.

Another reducing agent suggested in the prior art for chlorine dioxide production is hydrogen peroxide. U.S. Pat. No. 2,332,181 discloses a batch process for chlorine dioxide production of substantially pure chlorine dioxide with respect to chlorine with hydrogen peroxide as the reducing agent. The process must be run at a low temperature and with low concentrations in the reactor to avoid explosive decomposition. Other patents suggest a combination of hydrogen peroxide and chloride ions as the reducing agent. This combination has the disadvantage of chlorine formation. U.S. Pat. No. 5,091,167 teaches that it is possible to produce chlorine dioxide continuously with high efficiency with hydrogen peroxide as the reducing agent in a chlorine free process with the SVP technology.

However, there is still a need for developing chlorine dioxide processes at atmospheric pressure with good efficiency and production rate but with reduced production of chlorine by-product as well as other by-products. For example, there are a large number of existing plants with atmospheric pressure generators having poor efficiency and capacity limitations. With increasing demand for chlorine dioxide bleaching, improvements of these plants would be of considerable interest. Also, for the installation of new plants, the atmospheric pressure process offers a low investment cost for the chlorine dioxide generator.

Another drawback of known chlorine dioxide processes is the formation of some form of sodium sulfate as a by-product which has to be removed from the reactor, either in the form of a solid saltcake or as waste acid. As mentioned above, most modern processes are operated under subatmospheric pressure, involving precipitation of the sodium sulfate as a saltcake which has to be removed from the reactor by filtering. Today it is hard to find any use for the saltcake and it is normally regarded as an unwanted by-product.

In order to avoid formation of a sulfate by-product, it has been disclosed to provide all acid needed for the chlorine dioxide generation from chloric acid which can be prepared electrochemically from sodium chlorate. Such methods are described in, for example, U.S. Pat. Nos. 4,915,927, 5,084,148 and 5,174,868. However, it has been found difficult to achieve satisfactory current efficiency in production of strong chloric acid which is desirable in order to provide efficient chlorine dioxide generation.

U.S. Pat. No. 4,806,215 discloses a process in which chlorine dioxide is generated from sodium chlorate and hydrochloric acid, in which process the generator liquor is acidified electrochemically and recycled back to the reactor. However, this process necessarily results in co-formation of chlorine which cannot be accepted in modern environmentally friendly bleaching processes.

U.S. Pat. No. 4,129,484 discloses a process of producing chlorine dioxide in which process sulfuric acid and sodium hydrogen sulfate is withdrawn from the reactor and subjected to electrolysis. However, the current efficiency obtained in the electrochemical cell is not satisfactory.

U.S. Pat. Nos. 5,198,080 and 5,122,240 disclose a process of producing chlorine dioxide involving crystallization and withdrawal of solid sodium sesquisulfate and optionally sodium chlorate. The solid salt is dissolved again, electrolytically acidified and recycled to the chlorine dioxide reactor. Since the process involves handling of solid material it is fairly complicated. Further, the sulfate solution obtained by dissolving the solid sesquisulfate is fairly dilute.

SUMMARY OF THE INVENTION

It is accordingly an object of the present invention to provide a chlorine dioxide process of high efficiency and high production rate, wherein little or no chlorine is formed as a by-product.

It is another object of the invention to provide a chlorine dioxide process, as above, wherein no other detrimental by-products are formed, and wherein valuable by-products, such as alkali metal hydroxide, hydrogen gas and oxygen gas, are formed.

The objects of the invention are achieved by a process for continuously producing chlorine dioxide at a pressure of about 400–900 mm Hg in a non-crystallizing process. Hydrogen peroxide is a preferred reducing agent. The acid normality in the aqueous reaction medium is from about 4 to about 14N and the chlorate concentration is between about 0.05 mole/l to about saturation. No substantial amount of chloride ions is added.

The objects of the invention are also achieved by a process for producing chlorine dioxide comprising the steps of (a) providing a reactor with an aqueous acidic reaction medium containing alkali metal chlorate and sulfate, wherein the concentration of sulfate exceeds about 3 moles/l but is less than saturation; (b) reducing chlorate ions in said reaction medium to form chlorine dioxide; (c) withdrawing chlorine dioxide gas from the reaction medium, (d) withdrawing reaction medium from the reactor and transferring it to an electrochemical cell; (e) electrolyzing the reaction medium to increase the acidity and decrease the content of alkali metal ions; (f) recycling the acidified reaction medium to the reactor; and (g) adding make up alkali metal chlorate to the reaction medium before or after the electrochemical cell; wherein the process is performed substantially without crystallization of sulfate or chlorate.

BRIEF DESCRIPTION OF THE DRAWING

For a full understanding of the invention, reference should be made to the following detailed description and the drawing, wherein.

DETAILED DESCRIPTION OF THE PREFERRED EMBODIMENTS

It has surprisingly been found that it is possible to produce chlorine dioxide safely with a high production rate and in a high yield in a non-crystallizing system. In one process alternative of the invention, hydrogen peroxide is used as the reducing agent and no substantial amounts of chloride ions are added to the reaction medium. In this first alternative, the process is run at a pressure which can vary from 400 mm to 900 mm Hg absolute and is most preferably at atmospheric or slightly below (i.e., a slight vacuum). Under such conditions, it is not necessary to add any chloride ions for a steady production. Neither is there any problem with dangerous decomposition in spite of the reaction conditions being rather strong both in respect of chlorate concentration as well as acid normality and temperature. The process is very efficient with a yield of more than 94%. Since hydrogen peroxide is used as the reducing agent in this first alternative, no substantial amount of chlorine is formed, nor are any other detrimental by-products.

In this first process alternative, it has also been found that the process has a lower cooling requirement than prior art processes. Due to the hydrogen peroxide reduced process being a heat consuming reaction, the overall amount of heat that has to be removed by cooling is reduced considerably compared to, for example, the Mathieson or Solvay process. Further, by operating at a slight subatmospheric pressure the evaporation rate of the water is increased. Thereby the heat from the system is removed and the need for external cooling is further reduced. In particulars the objects of the invention are achieved in this first alternative by a process for continuously producing chlorine dioxide by reacting an alkali metal chlorate, sulfuric acid or another chlorine free mineral acid such as phosphoric acid, and hydrogen peroxide as a reducing agent to produce chlorine dioxide in an aqueous reaction medium, characterized in that the chlorine dioxide is generated in at least one reaction step comprising at least one reaction vessel, by feeding alkali metal chlorate, acid, hydrogen peroxide and inert gas to the reaction vessel, in the substantial absence of added chloride ions, maintaining the aqueous reaction medium in the reaction vessel at a pressure of from about 400 mm Hg to about 900 mm Hg, at a temperature of from about 35° C. to about 100° C., at an acidity within a range from about 4 to about 14N and at a chlorate concentration of between about 0.05 molar to saturation, withdrawing chlorine dioxide, oxygen and inert gas and the depleted aqueous reaction medium from the reaction zone without substantial crystallization of alkali metal sulfate.

It has been found that the concentration of chlorate in the reaction system is very important. By raising the chlorate concentration to higher levels than normal, high production rates and high yields are obtained. The increase of the production rate is as much as two to three times compared to the atmospheric pressure systems known in the art. The ability to use hydrogen peroxide as a reducing agent in an atmospheric pressure system with higher than normal chlorate concentration and without chloride ions was unexpected since the prior art teaches either a combination of hydrogen peroxide and chloride or the use of very cautious reaction conditions. The high efficiency of the process also brings about the advantage of a low amount of produced by-product alkali metal sulfate.

This first process alternative of the invention can be used in all types of known reaction equipment for atmospheric pressure reactions. Thus reactors normally used for Mathieson or Solvay or R-2 processes can be used. In the process according to this embodiment, alkali metal chlorate, sulfuric acid, hydrogen peroxide and inert gas are continuously fed to the reaction vessel. Inert gas is added to the reaction vessel to obtain sufficient mixing and to maintain a safe partial pressure of the chlorine dioxide. With the hydrogen peroxide chemistry, oxygen is formed in situ as the reaction proceeds. The oxygen bubbles formed create both mixing and dilution of the chlorine dioxide. Thereby the flow of inert gas can be reduced compared to prior art processes. This also enables part of the inert gas to be introduced to the top of the reaction vessel in order to decrease the foaming. Thus it is possible to reduce the amount of inert gas introduced into the bottom of the vessel. Usually the reaction is carried out in more than one reaction vessel. The depleted reaction medium is brought to a second (or subsequent) reaction vessel with an additional amount of hydrogen peroxide and inert gas to further deplete the solution with respect to alkali metal chlorate.

In a preferred embodiment of the first process alternative, the process is carried out in two reaction steps. The first step comprises at least one reaction vessel with reaction conditions as stated above. At least a part of the depleted aqueous reaction medium from the first reaction step and alkali metal chlorate and hydrogen peroxide are brought to a second reaction step comprising a single reaction vessel. The reaction medium therein is maintained at a temperature of from about 50° C. to about 100° C. and the acidity within a range of from about 2 to about 5N. The reaction medium is subjected to subatmospheric pressure sufficient for evaporating water. A mixture of chlorine dioxide, oxygen and water vapor is withdrawn from an evaporation zone in the reaction vessel and neutral alkali metal sulfate is precipitated in a crystallization zone in the reaction vessel. By combining a reaction step which produces a depleted reaction medium with the SVP technology, the acid content of the depleted reaction medium from the first reaction step can be used as acid medium in the SVP reaction vessel. As the process in the SVP reactor is run in a low acid normality range the precipitated alkali metal sulfate from the SVP reactor will be neutral, which is an advantage. Thus, with this combination of reaction steps there will be no depleted reaction medium to take care of but only a neutral sulfate salt. The combination as described is known in the state of the art as "cascading" of reaction vessels. However, it has not heretofore been made with hydrogen peroxide as the reducing agent. The advantages with "cascading" and hydrogen peroxide being a totally chlorine free system, a neutral salt by-product and a process with a commercially acceptable production also in the SVP reaction step. It is well known in the art that SVP processes, with other reducing agents, in the low acid normality range (2–5N) are too slow to be of commercial interest, at least without the aid of catalysts.

In a further embodiment of the first process alternative of the present invention, the depleted reaction solution from the first reaction step is fed to an electrolytic cell. Such a process is known in the state of the art, e.g. from U.S. Pat. No. 4,129,484, the disclosure of which is incorporated herein by reference. Conventional cells could be used. A suitable electrolytic cell is equipped with an anode and a cathode and preferably at least one cationic membrane. Both FIG. 1 and FIG. 2, described in more detail hereinafter with respect to a further embodiment of the invention, illustrate such suitable electrolytic cells.

The depleted reaction solution from the chlorine dioxide reaction vessel is fed to the anolyte compartment of the cell and withdrawn as an acid enriched reaction solution which can be recirculated to the chlorine dioxide reaction vessel. In the cathode compartment alkali metal hydroxide is formed. Thus with this process it is possible to work up the depleted reaction solution into two useful streams, one being the enriched acid solution which can be brought back into the system and the other being the alkali metal hydroxide. By this method the alkali metal added to the chlorine dioxide reaction vessel can be withdrawn as a useful chemical instead of as a by-product. Depending upon the choice of anode an additional cationic membrane can be used between the reaction solution compartment and the anode. With an additional membrane it is possible to avoid the oxidizing environment at certain anodes and to prolong the life time for the anodes. When an additional cationic membrane is used the anolyte and membrane used are suitably insensitive to the oxidizing environment at certain anodes.

It is also possible to feed the precipitated alkali metal sulfate formed as a by-product from an SVP reaction vessel to an electrolytic cell in the same manner as mentioned above. In this embodiment the precipitated sulfate is dissolved and added as a solution to the electrolytic cell.

The production of chlorine dioxide according to the first process alternative is performed by adding the alkali metal chlorate, sulfuric acid and hydrogen peroxide to the first reaction step. An aqueous reaction medium is maintained in the first reaction vessel with a chlorate concentration of from about 0.05 moles/l to saturation, preferably from about 0.09 to about 3.75 moles/l, most preferably from about 0.09 to about 1.1 moles/l. The acidity in the reaction medium should be within the range of from about 4 to 14N, preferably from about 6–12N, and most preferably from 7.5–10N. Hydrogen peroxide is added in an amount of from about 0.16 to about 0.6 ton/ton chlorate, suitably from about 0.16 to about 0.32, preferably 0.16 to 0.22 ton/ton chlorate. Inert gas is introduced into the reaction vessel to provide agitation of the reaction medium and more importantly to dilute the produced chlorine dioxide to a safe concentration. The amount of inert gas added is conventional, i.e. sufficient to maintain the partial pressure of the chlorine dioxide below about 100 mm Hg. The inert gas may be air, nitrogen, carbon dioxide or the process off-gas comprising oxygen and trace amounts of chlorine dioxide. The advantage of using the process off-gas as the inert gas is mainly that a relatively pure gas containing a high concentration of oxygen is generated. A further advantage is that the vent from the process will be reduced. Thus, it is a preferred embodiment to use the process off-gas as the inert gas.

The first reaction vessel is suitably operated at a temperature of 35° to 100° C., preferably from 45° C. to 70° C. and most preferably at 50° to 55° C. and at a pressure of from about 400 mm Hg to about 900 mm Hg, preferably from about 600 mm Hg to 800 mm Hg and most preferably from about 720 mm Hg to about 800 mm Hg. Thus it is preferred to operate at about atmospheric pressure. The reaction is a non-crystallizing reaction and a depleted reaction medium leaves the reactor without any substantial crystallization of the alkali metal sulfate.

The first process alternative is an essentially chlorine free process. No substantial amount of chloride ions are added. To the contrary, it has been found that chloride ions have a detrimental influence on the process and lead to a low hydrogen peroxide efficiency. The chlorate used in the process is conventional, commercially available chlorate. By way of manufacture such chlorate always contains a small amount of chloride. That amount of chloride is not more than about 0.5, often not more than about 0.05, preferably not more than about 0.02, most preferably not more than about 0.01 weight percent of the alkali metal chlorate. Beside this amount of chloride being an impurity in the chlorate, no further chloride is added. There is also commercially available chlorate with higher amounts of chloride. This type of chlorate has been obtained by adding extra alkali metal chloride to the chlorate. Such a chlorate is not suitable for the present process.

When the first reaction step is run in more than one reaction vessel such as in a conventional Mathieson process, the depleted reaction medium from the first reaction vessel is brought to a second (or subsequent) reaction vessel. Inert gas and hydrogen peroxide are introduced and more chlorate in the depleted medium is converted to chlorine dioxide. The amount of added hydrogen peroxide in this second reactor is suitably up to 50% of the entire hydrogen peroxide required for reaction, and preferably only about 15% of the total amount required. The pressure in the second reactor is about atmospheric pressure and the temperature is the same as in the first reaction vessel. It is suitable to add heat to the second reactor to maintain the temperature at the stated value. This heat may be added by an external heater or by adding additional sulfuric acid to the second reactor.

In the non-crystallizing process inert gas is introduced in the reaction vessel, usually through the bottom, and chlorine dioxide and oxygen are liberated in the reaction medium. The introduction of inert gas bubbles in the medium as well as the release of gas bubbles in the reaction products brings about a tendency for foaming of the reaction medium, especially at higher rates. As mentioned above, inert gas is introduced into the reaction vessel to dilute the chlorine dioxide formed to safe concentration. The total quantity of inert gas that must be added is then fixed depending on the value of the safe partial pressure of the chlorine dioxide formed.

However the method and mode of injection of the dilution inert gas is not fixed. Normally all inert gas is introduced at the bottom of the vessel. In a preferred embodiment of the first process alternative of the present invention, only a portion of the inert gas needed is injected in the bottom of the reaction vessel and through the reaction medium. The rest of the inert gas is supplied to the space above the liquid level in the vessel. With this mode of introduction the foaming of the reaction medium can be reduced to a great extent or totally eliminated. The proportion of inert gas supplied to the space above the liquid level is suitably 80% of the total amount of inert gas, preferably 50% and most preferably 20%. A suitable mode of arrangement of this divided inert gas supply must insure that the chlorine dioxide and dilution inert gas are well mixed in the vapor space above the reaction liquid. This can be achieved with multiple injection points, spargers, or baffles.

Another measure that can be taken to minimize the tendency of foaming is to increase the holes in the sparger through which the inert gas is introduced.

In the embodiment with cascading the first reaction step with an SVP reaction vessel, at least a part of the depleted reaction medium from the first reaction step is brought to the single reaction vessel to provide a reaction medium with an acid strength of from about 2 to about 5N. The reaction conditions in the vessel are suitably as stated in U.S. Pat. No. 5,091,166, the disclosure of which is incorporated herein by reference. Thus, alkali metal chlorate concentration in the reaction vessel can vary within wide limits, from a low concentration of about 0.25M up to saturation, preferably from about 1.5M up to saturation, most preferably from about 2.5M up to saturation. Hydrogen peroxide can be added in amounts of from about 0.16 to about 0.6 ton/ton chlorate, preferably from about 0.16 to about 0.32 ton/ton chlorate, and most preferably from 0.16 to 0.22 ton/ton chlorate. The reactants are added continuously to the reactor. The reaction is suitably operated at a temperature of 50°–100° C., preferably 50°–75° C. and at a pressure below atmospheric pressure, suitably at 60–400 mm Hg. The reaction medium boils or water is evaporated in an amount sufficient to dilute the chlorine dioxide formed to a safe concentration. The acidity in the reactor is adjusted if necessary with extra sulfuric acid. In this reactor the alkali metal sulfate formed in the total process is continuously crystallized and separated in at suitable manner. Thus instead of a depleted reaction medium as a by-product to take care of from the reactor the process in this embodiment produces a pure, neutral alkali metal sulfate.

The process is not restricted to any of the alkali metals, but sodium is the most preferred.

In a second process alternative, an electrochemical cell is used in conjunction with a reactor using a wide variety of reducing agents and reaction conditions. The alkali metal can be any alkali metal but is preferably sodium.

It is to be understood that the reaction medium entering the electrochemical cell has substantially the same composition as it has in the chlorine dioxide reactor. The reactor for generation of chlorine dioxide can be of any known type, such as SVP®, Mathieson and others, the reactor however being operated without crystallization.

It has been found that if the aqueous reaction medium is transferred directly to the electrochemical cell, without any intermediate crystallization, it is possible to maintain a high content of sulfate during the electrolysis. It has also been found that the current efficiency during the electrolysis increases with the sulfate content of the reaction medium. Preferably the sulfate content exceeds about 4 moles/l. The upper limit is determined by the concentration at saturation which is dependent on several parameters, particularly the acidity. For instance, if the reaction medium has an acidity at about 1N, alkali metal sulfate starts crystallizing at about 5 moles/l, and if the acidity is about 6.5N, the sulfate crystallizes at about 6.5 moles/l. Most preferably, the process is operated at a sulfate concentration just below saturation.

It has also been found that the current efficiency during the electrolysis is improved if the molar ratio $H^+:SO_4^{2-}$ is low. However, the solubility of sulfate also decreases with the above ratio. Further, the production rate of chlorine dioxide is improved if the acidity is high. The preferred content of $H^+$ in the reaction medium is from about 1.5 to about 11 moles/l, most preferably from about 3 to about 9 moles/l. In order to obtain high efficiency both for the chlorine dioxide generation and the electrochemical acidification, it has been found that the optimal molar ratio $H^+:SO_4^{2-}$ suitably is from about 0.5 to about 1.5, preferably from about 0.7 to about 1.3.

In this second process alternative, the chlorate ions in the reactor are most preferably reduced by a reducing agent, but electrochemical reduction is also possible. Suitably, a reducing agent is added to the reaction medium, which reducing agent can be selected from organic substances such as methanol, ethanol, isopropanol, other alcohols or formaldehyde, or from inorganic substances such as hydrogen peroxide or chloride ions. Also mixtures of different reducing agents can be used. Hydrogen peroxide and methanol are the most preferred reducing agents since they offer the possibility of efficiently producing chlorine dioxide substantially without formation of chlorine. A particular advantage of using hydrogen peroxide is that a high production rate can be achieved at low acidities, for example from about 2 to about 5N, and that no by-products that may damage the electrochemical cell are produced.

The chlorine dioxide producing reactions are favored by the addition of small amounts of catalysts to the reactor. Preferred catalysts belong to the groups VB–VIII, IB, IVA and VIIA of the Periodic Table of the Elements. High activity can be achieved by compounds containing V, Nb, Cr, Mn, Fe, Ru, Os, Ni, Pd, Pt, Cu, Ag, Ge, Sn, Pb, Br, and I, either alone or in combinations.

Although not necessary, it is possible to add small amounts of chloride ions, preferably in the form of alkali metal chloride, so as to maintain the concentration thereof in the reaction medium within the range from about 0.001 up about 0.8 mole/liter.

Chlorine dioxide generation can take place under atmospheric pressure, i.e., within the range of pressure set forth above with respect to the first process alternative. The reaction medium may alternatively be maintained under subatmospheric pressure in the reactor, which enables higher concentration of chlorine dioxide without risk for explosion and also improves the yield. However, contrary to conventional subatmospheric processes for chlorine dioxide production, no sulfate is crystallized. Suitably, the absolute procedure is maintained from about 60 to about 600 mm Hg, preferably from about 75 to about 400 mm Hg, most preferably from about 75 to about 350 mm Hg. However, it is preferred to operate the electrochemical cell at atmospheric pressure, since pressure fluctuations in the different chambers may damage the membranes.

The temperature in the reactor is suitably from about 15° to about 100° C., preferably from about 40° to about 85° C. The temperature in the electrochemical cell is suitable maintained at substantially the same temperature as in the reactor.

Any suitable electrochemical cell enabling acidification of the reaction medium can be used. Normally, a cell comprising an anode compartment and a cathode compartment divided by at least one ion selective membrane is best suitable. In addition to an anode and a cathode compartment, such a cell may comprise one or several compartments in the middle. Any standard type of electrodes can be used. Further, standard polymeric ion-exchange membranes can be used, but also high ion conducting membranes such as ceramic membranes can be useful. Normally, it is possible to achieve a current efficiency of more than about 70% or even more than about 80%.

In one preferred embodiment of the second process alternative, the reaction medium to be acidified is supplied to the middle compartment of a three chamber cell comprising two cation-exchange membranes. Preferably, water or an aqueous solution containing sulfuric acid is supplied to the anode compartment and water or an aqueous solution containing alkali metal hydroxide is supplied to the cathode compartment. In such a cell, hydrogen ions are generated in the anode compartment and passed through the membrane into the middle compartment replacing alkali metal ions passed into the cathode compartment. In the anode compartment oxygen gas is produced, while hydrogen gas and hydroxide ions are produced in the cathode compartment. The advantage of this embodiment is that substances that may be present in the reaction medium, such as chlorate, chloride ions and methanol, are not so easily oxidized on the anode, thus avoiding formation of perchlorate, chlorine and formic acid. Further, the lifetime of the anode is increased.

It is also possible to perform the electrolysis in electrochemical cells known per se, for example, from a cell disclosed in the above-mentioned U.S. Pat. No. 4,229,487. Thus, it is possible to use a three chamber cell in which the middle compartment is defined by an anion exchange membrane and a cation exchange membrane, entering the reaction medium into the middle compartment, passing chlorate ions and sulfate ions through an anion-exchange membrane into the anode compartment, and withdrawing acidified reaction medium therefrom. Further, a two chamber cell divided by an cation-exchange membrane could be used, acidifying the reaction medium in the anode compartment and passing alkali metal ions through the cation-exchange membrane into the cathode compartment. In these cases, it is also possible to produce alkali metal hydroxide, hydrogen gas and oxygen gas as valuable by-products. It is also possible to use a two chamber cell divided by a anion-exchange membrane. The main advantage of using a two chamber cell is that the investment costs are lower.

The method according to the invention can be performed substantially without removing any chlorate or sulfate from the system. Substantially all chlorate supplied is transformed to chloride dioxide, i.e. the main product. The alkali metal supplied can be withdrawn from the system as alkali metal hydroxide, a valuable by product. Sulfate is neither added nor withdrawn, but is circulating as a dead load, improving the efficiency of the electrochemical acidification of the reaction medium. Thus, it has been found possible to provide a method of producing chlorine dioxide from alkali metal chlorate without formation of by products other than valuable substances such as alkali metal hydroxide, hydrogen gas and oxygen gas. Another advantage of the invention, is that only a small amount of water has to be added to the system, thus decreasing the amount that has to be heated and withdrawn by evaporation. Normally, water is only added to the system as a solvent for the make-up alkali metal chlorate and the reducing agent.

Since no salt is crystallized, there is no need for any filter which saves a considerable amount of the investment costs. Also, since every alkali metal ion brings a couple of water molecules when passing the membrane in the cell, water will leave the system which involves the advantage that less water has to be evaporated in the chlorine dioxide reactor, thus saving energy.

Figure 1:
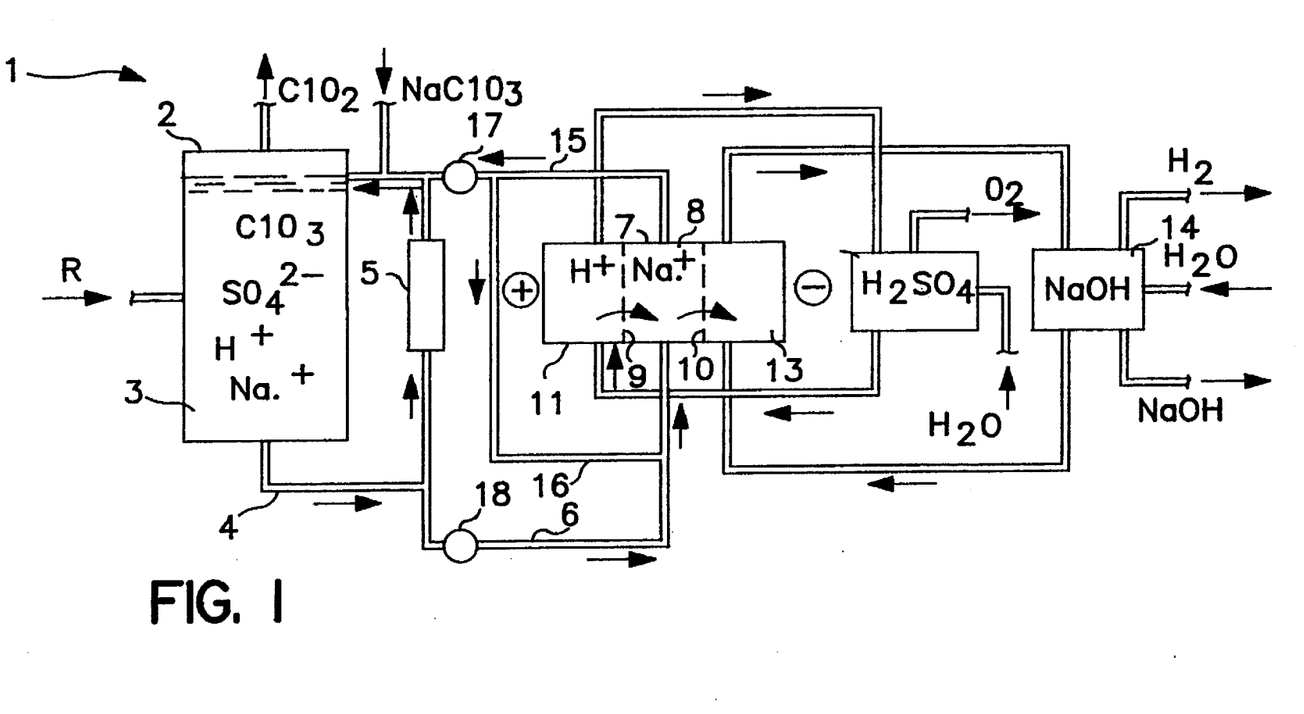
FIG. 1 is a schematic illustration of one embodiment of the invention employing an electrochemical cell having three compartments.
Figure 2:
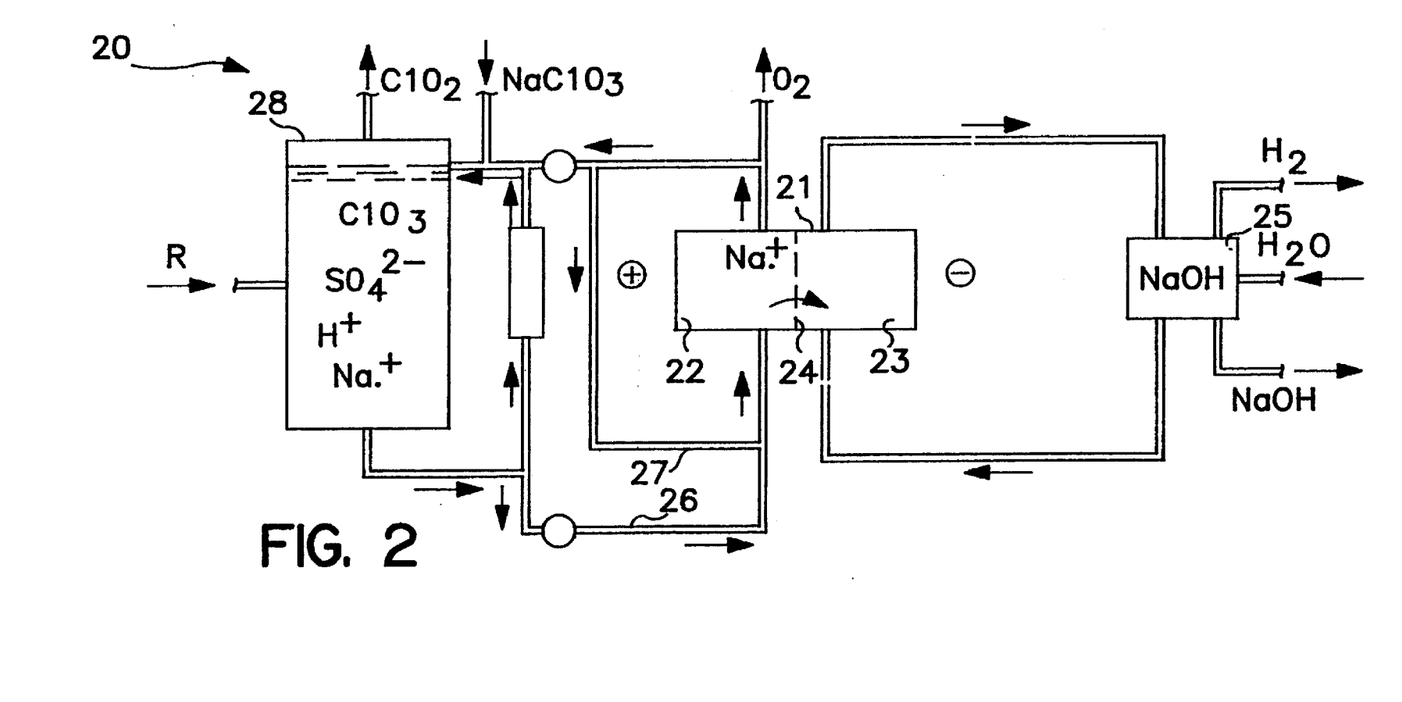
FIG. 2 is a schematic illustration of a second embodiment of the invention employing an electrochemical cell having two compartments.

The invention will now be described more in detail with reference to the drawings. FIGS. 1 and 2 schematically show two different embodiments of the invention. The invention is, however, not restricted to what is described below, and it is apparent to those skilled in the art that many other embodiments can be employed within the scope of the claims.

Referring to FIG. 1, a preferred system for producing chlorine dioxide is indicated generally by the number 1 and comprises an SVP®-reactor 2 containing an aqueous reaction medium 3. In the reaction medium 3 chlorate ions, sulfate ions, hydrogen ions and sodium ions are present. A reducing agent R, preferably methanol or hydrogen peroxide, is supplied to the reaction medium 3 while chlorine dioxide generated in the reaction medium 3 is withdrawn as a gas together with evaporated water thereby diluting the chlorine dioxide to a safe concentration. In the reactor 2, the absolute pressure is preferably from about 75 to about 400 mm Hg and the temperature is preferably from about 50° to about 85° C. If methanol is used as the reducing agent R, the reaction medium 3 preferably contains chlorate in a concentration just below saturation, normally from about 4 to about 5 moles/l. Further, it preferably contains from about 6 to about 7 moles/l of sulfate, from about 10 to about 12 moles/l of sodium, and has an acidity from about 6 to about 7 N.

If hydrogen peroxide is used as the reducing agent, the chlorate content of the reaction medium 3 is preferably just below saturation, normally from about 4 to about 5 moles/l of sodium and has an acidity from about 4 to about 5N. The reaction medium 3 is continuously circulating through line 4 and a heater 5. Part of the circulating reaction medium is withdrawn from line 4 to line 6 and transferred to the central compartment 7 of a three chamber cell 8 comprising two cation-exchange membranes 9, 10. In the cell 8, the anode compartment 11 is supplied with sulfuric acid from a tank 12 and the cathode compartment 13 is supplied with sodium hydroxide from a tank 14. In the anode compartment 11, hydrogen ions are generated and passed through the membrane 9 into the central compartment 7. Sodium ions from the reaction medium in the central compartment 7 are passed through the membrane 10 into the cathode compartment 13.

The electrochemical reactions result in acidification of the reaction medium in the central compartment 7, generation of oxygen gas in the anode compartment, and generation of sodium hydroxide and hydrogen gas in the cathode compartment 13. The acidified reaction medium is withdrawn from the central compartment 7 of the cell 8 through line 15, mixed with the reaction medium from the heater 5 and with an aqueous solution of make up sodium chlorate, and then recycled back to the reactor 2. A portion of it can be recycled back to the cell 5 through line 16. In the tank 12, oxygen is withdrawn and water is added to the anolyte. The three chamber cell 8 is operated under atmospheric pressure and the connections between the cell 8 and the reactor 1 is therefore provide with means 17, 18 for altering the pressure of the reaction medium. In the tank 14, hydrogen and sodium hydroxide are withdrawn and water is added to the catholyte. Means 17, 18 can consist of pumps and/or valves for maintaining a pressure differential. Alteratively, the reactor 2 can be placed at a higher level than the cell 8, thus maintaining a pressure differential by gravity (static head).

If the acidity in the chlorine dioxide reactor 2 is too low, the production rate decreases. On the other hand, if the acidity in the cell 8 is too high, the current efficiency decreases. In order to achieve both effective chlorine dioxide production and high current efficiency, the system comprises two recirculation loops for the reaction medium, one including the reactor 2, line 4 and the heater 5, the other including the cell 8 and line 16. The acidity in the loop including the cell 8 cannot be lower than in the other loop, but it could be almost the same. The difference in acidity of the medium in the two loops should be as low as possible, suitably below about 0.5N, preferably below about 0.3N, most preferably below about 0.1N.

Referring to FIG. 2, another preferred embodiment for producing chlorine dioxide is indicated generally by the number 20. The system is similar to the one shown in FIG. 1, except that the electrochemical cell 21 only consist of two chambers 22, 23 divided by a cation-exchange membrane 24. The chlorine dioxide reactor 2 and the catholyte system 23, 25 are operated as in FIG. 1. The reaction medium to be acidified is transferred through line 26 to the anode compartment 22 of the cell 21, in which compartment 22 hydrogen ions and oxygen gas are generated. Sodium ions are passed through the cation-exchange membrane 24 into the cathode compartment 23 in which hydroxide ions and hydrogen gas are generated. The portion of the acidified reaction medium withdrawn from the anode compartment 22 not recycled back to the cell 21 through line 27 is transferred to the chlorine dioxide reactor 28 in the same manner as in FIG. 1. Accordingly, chlorine dioxide, sodium hydroxide, hydrogen gas and oxygen gas are produced as in the system described in FIG. 1.

The following Examples are intended to describe some specific ways of operating the process of the invention but should not be interpreted as limiting its scope.

Examples 1–3 relate to the first process alternative using atmospheric pressure in the reactor and hydrogen peroxide as the reducing agent. Examples 4–7 relate to the second process alternative using subatmospheric pressure in the reactor and either methanol or hydrogen peroxide as the reducing agent.

EXAMPLE 1

To a laboratory chlorine dioxide generator a water solution of 64 g/liter chlorate was added with 382 g/liter sulfuric acid. A chlorate concentration of 0.38M and an acid strength of 7.8N was thus maintained in the generator. 30% hydrogen peroxide solution was also added such that the hydrogen peroxide concentration in the reactor was 3.6 g/liter. The reactor was operated at atmospheric conditions and maintained at 60° C. The chlorine dioxide production rate as $1.4 \times 10^{-2}$ moles/(liter-minute). The predicted chlorine dioxide production rate was $1.44 \times 10^{-2}$ moles/(liter-minute).

EXAMPLE 2

To a laboratory chlorine dioxide generator a water solution of 64 g/liter chlorate was added with 502 g/liter sulfuric acid. A chlorate concentration of 0.13M and an acid strength of 10.2 N was thus maintained in the generator. 30% hydrogen peroxide solution was also added such that the hydrogen peroxide concentration in the reactor was 1.4 g/liter. The reactor was operated at atmospheric conditions and maintained at 60° C. The chlorine dioxide production rate was $2.16 \times 10^{-2}$ moles/(liter-minute). The predicted chlorine dioxide production rate was $2.64 \times 10^{-2}$ moles/(liter-minute).

EXAMPLE 3

A commercial generator of 1400 gallons of liquid capacity in the primary reactor and 1400 gallons of liquid capacity in a secondary reactor in series produced 10 tons of chlorine dioxide per day utilizing traditional Solvay chemistry running at an acid normality of 9.5N and a chlorate concentration of 0.23M at the overflow of the first reactor. Changing the reducing agent to hydrogen peroxide allowed a production increase to 18 tons of chlorine dioxide per day when operated at 8N and 30 tons of chlorine dioxide per day when operated at 10N with a chlorate concentration of 0.83M in both cases at the overflow of the first reactor.

EXAMPLE 4

A 3 liter chlorine dioxide reactor was connected to a three chamber MP-cell™ (Electrocell AB, Sweden), forming a system as described in FIG. 1 with a total volume of 5 liters. The system was charged with 5 liters of an aqueous solution consisting of 5.4 moles/l $H^+$, 5.4 moles/l $SO_4^{2-}$, 1.9 moles/l $ClO_3^-$ and 7.3 moles/l $Na^+$. The anolyte was maintained constant at 100 g/l sulfuric acid by addition of water, and the catholyte was maintained constant at 140 g/l sodium hydroxide by withdrawing sodium hydroxide and feeding water. The chlorine dioxide generator was operating at 60° C. and 150 mm Hg, and the cell was operating at the same temperature but at atmospheric pressure. Methanol was used as the reducing agent and the system was fed with a 545 g/l sodium chlorate solution. The cell was operating at a current of 30 A, corresponding to a current density of 3 kA/m², and the system was operating at steady state conditions for 5 hours. The current efficiency for sodium hydroxide production was 67% and the gram atom efficiency for chlorine dioxide production was 100%.

EXAMPLE 5

A 3 liter chlorine dioxide reactor was connected to a three chamber MP-cell™ (Electrocell AB, Sweden), forming a system as described in FIG. 1 with a total volume of 5 liters. The system was charged with 5 liters of an aqueous solution consisting of 3.2 moles/l $H^+$, 3.35 moles/l $SO_4^{2-}$, 3.3 moles/l $ClO_3^-$ and 6.8 moles/l $Na^+$. The anolyte was maintained constant at 100 g/l sulfuric acid by addition of water, and the catholyte was maintained constant at 140 g/l sodium hydroxide by withdrawing sodium hydroxide and feeding water. The chlorine dioxide generator was operating at 65° C. and 195 mm Hg, and the cell was operating at the same temperature but at atmospheric pressure. Hydrogen peroxide was used as the reducing agent and the system was fed with a 530 g/l sodium chlorate solution. The cell was operated at a current of 30 A, corresponding to a current density of 3 kA/m², and the system was operated at steady state conditions for 8 hours. The current efficiency for sodium hydroxide production was 71% and the gram atom efficiency for chlorine dioxide production was 100%.

EXAMPLE 6

A 3 liter chlorine dioxide reactor was connected to a two chamber MP-cell™ (Electrocell AB, Sweden), forming a system as described in FIG. 2 with a total volume of 5 liters. The system was charged with 5 liters of an aqueous solution consisting of 6 moles $H^+$, 6 moles/l $SO_4^{2-}$, 2 moles/l $ClO_3^-$ and 8 moles/l $Na^+$. The catholyte was maintained constant at 140 g/l sodium hydroxide by withdrawing sodium hydroxide and feeding water. The chlorine dioxide generator was operated at 60° C. and 150 mm Hg, and the cell was operated at the same temperature but at atmospheric pressure. Methanol was used as a reducing agent and the system was fed with a 545 g/l sodium chlorate solution. The cell was operated at a current of 30 A, corresponding to a current density of 3 kA/m², and the system was operated at steady state conditions for 8 hours. The current efficiency for sodium hydroxide production was 66% and the gram atom efficiency for chlorine dioxide production was 100%.

EXAMPLE 7

A 3 liter chlorine dioxide reactor was connected to a three chamber MP-cell™ (Electrocell AB, Sweden), forming a system as described in FIG. 2 with a total volume of 5 liters. The system was charged with 5 liters of an aqueous solution consisting of 4 moles $H^+$, 4 moles/l $SO_4^{2-}$, 2.2 moles/l $ClO_3^-$ and 6.2 moles/l $Na^+$. The catholyte was maintained constant at 140 g/l sodium hydroxide by withdrawing sodium hydroxide and feed water. The chlorine dioxide generator was operated at 65° C. and 195 mm Hg, and the cell was operated at the same temperature but at atmospheric pressure. Hydrogen peroxide was used as a reducing agent and the system was fed with a 530 g/l sodium chlorate solution. The cell was operated at a current of 30 A, corresponding to a current density of 3 kA/m², and the system was operated at steady state conditions for 8 hours. The current efficiency for sodium hydroxide production was 70% and the gram atom efficiency for chlorine dioxide production was 100%.

What is claimed is:

1. A process for producing chlorine dioxide, comprising the steps of:

(a) providing a reactor with an aqueous acidic reaction medium containing alkali metal chlorate and sulfate, wherein the concentration of sulfate exceeds about 3 moles/l but is less than saturation;

(b) reducing chlorate ions in said reaction medium to form chlorine dioxide;

(c) withdrawing chlorine dioxide gas from the reaction medium;

(d) withdrawing reaction medium from the reactor and transferring it to an electrochemical cell;

(e) electrolyzing said reaction medium to increase the acidity and decrease the content of alkali metal ions;

(f) recycling the acidified reaction medium to the reactor; and (g) adding make-up alkali metal chlorate to the reaction medium upstream or downstream of the electrochemical cell;

wherein the process is conducted under non-crystallizing conditions.

2. A process as claimed in claim 1, wherein the content of sulfate in the reaction medium exceeds about 4 moles/l.

3. A process as claimed in claim 1, wherein the molar ratio $H^+:SO_4^{2-0}$ in the reaction medium is from about 0.5 to about 1.5.

4. A process as claimed in claim 1, wherein the absolute pressure in the chlorine dioxide producing reactor is maintained from about 60 to about 600 mm Hg.

5. A process as claimed in claim 1, wherein the electrochemical cell is operated under atmospheric pressure.

6. A process as claimed in claim 1, wherein a reducing agent is added to the reaction medium.

7. A process as claimed in claim 26, wherein the reducing agent is methanol or hydrogen peroxide.

8. A process as claimed in claim 1, wherein the reaction medium to be acidified is supplied to the middle compartment of a three chamber electrochemical cell comprising two cation-exchange membranes.

9. A process as claimed in claim 1, wherein the reaction medium to be acidified is supplied to the anode compartment of a two chamber electrochemical cell comprising a cation-exchange membrane.

10. A process as claimed in claim 1, wherein the process is conducted under conditions of non-removal sulfate.

11. A process of producing chlorine dioxide, comprising the steps of:
(a) providing a reactor with an aqueous acidic reaction medium containing alkali metal chlorate and sulfate, wherein the concentration of sulfate exceeds about 3 moles/l but is less than saturation;
(b) maintaining an absolute pressure from about 75 to about 400 mm Hg in the reactor;
(c) reducing chlorate ions in said reaction medium to form chlorine dioxide;
(d) withdrawing chlorine dioxide gas from the reaction medium;
(e) withdrawing reaction medium from the reactor and transferring it to an electrochemical cell;
(f) electrolyzing said reaction medium to increase the acidity and decrease the content of alkali metal ions;
(g) recycling the acidified reaction medium to the reactor; and
(h) adding make-up alkali metal chlorate to the reaction medium upstream or downstream of the electrochemical cell;
wherein the process is conducted under non-crystallizing conditions.

12. A process as claimed in claim 11, wherein the absolute pressure in the chlorine dioxide producing reactor is maintained from about 75 to about 350 mm Hg.

13. A process as claimed in claim 11, wherein the content of sulfate in the reaction medium exceeds about 4 moles/l.

14. A process as claimed in claim 11, wherein the molar ratio $H^+:SO_4^{2-}$ in the reaction medium is from about 0.5 to about 1.5.

15. A process as claimed in claim 1, wherein the process further comprises the steps of:
recirculating reaction medium from the reactor in a first circulation loop;
withdrawing a portion of the reaction medium from the first loop and transferring it to a second circulation loop comprising the electrochemical cell; and
withdrawing a portion of the medium from the second loop and transferring it to the first loop.

16. A process as claimed in claim 15, wherein the difference in acidity between the two loops is less than about 0.5N.

17. A process as claimed in claim 1, wherein the alkali metal values supplied to the reactor as alkali metal chlorate are recovered from the process as alkali metal hydroxide.

18. A process as claimed in claim 10, wherein the alkali metal values supplied to the reactor as alkali metal chlorate are recovered from the process as alkali metal hydroxide.

* * * * *